(12) United States Patent
Fabre et al.

(10) Patent No.: US 12,172,395 B2
(45) Date of Patent: Dec. 24, 2024

(54) COMPACTING BLOCK FOR A FAN CASING MOULD

(71) Applicant: SAFRAN AIRCRAFT ENGINES, Paris (FR)

(72) Inventors: Hubert Jean Marie Fabre, Moissy-Cramayel (FR); Raoul Jaussaud, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/692,692

(22) PCT Filed: Sep. 6, 2022

(86) PCT No.: PCT/FR2022/051677
§ 371 (c)(1),
(2) Date: Mar. 15, 2024

(87) PCT Pub. No.: WO2023/041861
PCT Pub. Date: Mar. 23, 2023

(65) Prior Publication Data
US 2024/0262054 A1   Aug. 8, 2024

(30) Foreign Application Priority Data
Sep. 16, 2021   (FR) .................................... 2109711

(51) Int. Cl.
*B29C 70/48* (2006.01)
*B29C 53/82* (2006.01)
*B29L 31/00* (2006.01)

(52) U.S. Cl.
CPC ............ *B29C 70/48* (2013.01); *B29C 53/821* (2013.01); *B29L 2031/7504* (2013.01)

(58) Field of Classification Search
CPC .............................. B29C 70/48; B29C 53/821; B29L 2031/7504
See application file for complete search history.

(56) References Cited

U.S. PATENT DOCUMENTS

2014/0239540 A1* 8/2014 Plante .................... B29C 33/48
425/111
2014/0262046 A1* 9/2014 Mathon ................. B29C 70/443
156/382
2022/0347945 A1* 11/2022 Blaise ................... B29C 70/541

FOREIGN PATENT DOCUMENTS

CA    2902849 A1    9/2014
EP    1961923 A2    8/2008
(Continued)

OTHER PUBLICATIONS

Search Report and Written Opinion issued in International Application No. PCT/FR2022/051677, issued Nov. 9, 2022.
(Continued)

*Primary Examiner* — Robert B Davis
(74) *Attorney, Agent, or Firm* — Bookoff McAndrews, PLLC

(57) ABSTRACT

Mold intended to be used for the manufacture of a gas turbine fan casing made of composite material including: a mandrel on which a fibrous preform of a fan casing is intended to be wound said preform comprising an annular wall the profile of the outer surface of which corresponds to that of the inner surface of the casing to be manufactured and two side flasks the profiles of which correspond to those of outer flanges of the casing to be manufactured; a plurality of angular counter-mold sectors assembled in a sealed manner on the mandrel and intended to close the mold and to compact a fibrous preform wound on the mandrel; and at least one compacting wedge, the wedge being placed between the fibrous preform wound on the mandrel and the associated angular counter-mold sector.

4 Claims, 4 Drawing Sheets

(56) References Cited

FOREIGN PATENT DOCUMENTS

| FR | 2958875 A1 | 10/2011 |
|----|------------|---------|
| WO | 2011161380 A1 | 12/2011 |
| WO | 2012140355 A1 | 10/2012 |
| WO | 2013050692 A1 | 4/2013 |
| WO | 2013060978 A1 | 5/2013 |

OTHER PUBLICATIONS

Search Report issued in French Application No. 2109711, mailed May 24, 2022.

* cited by examiner

[Fig. 1]
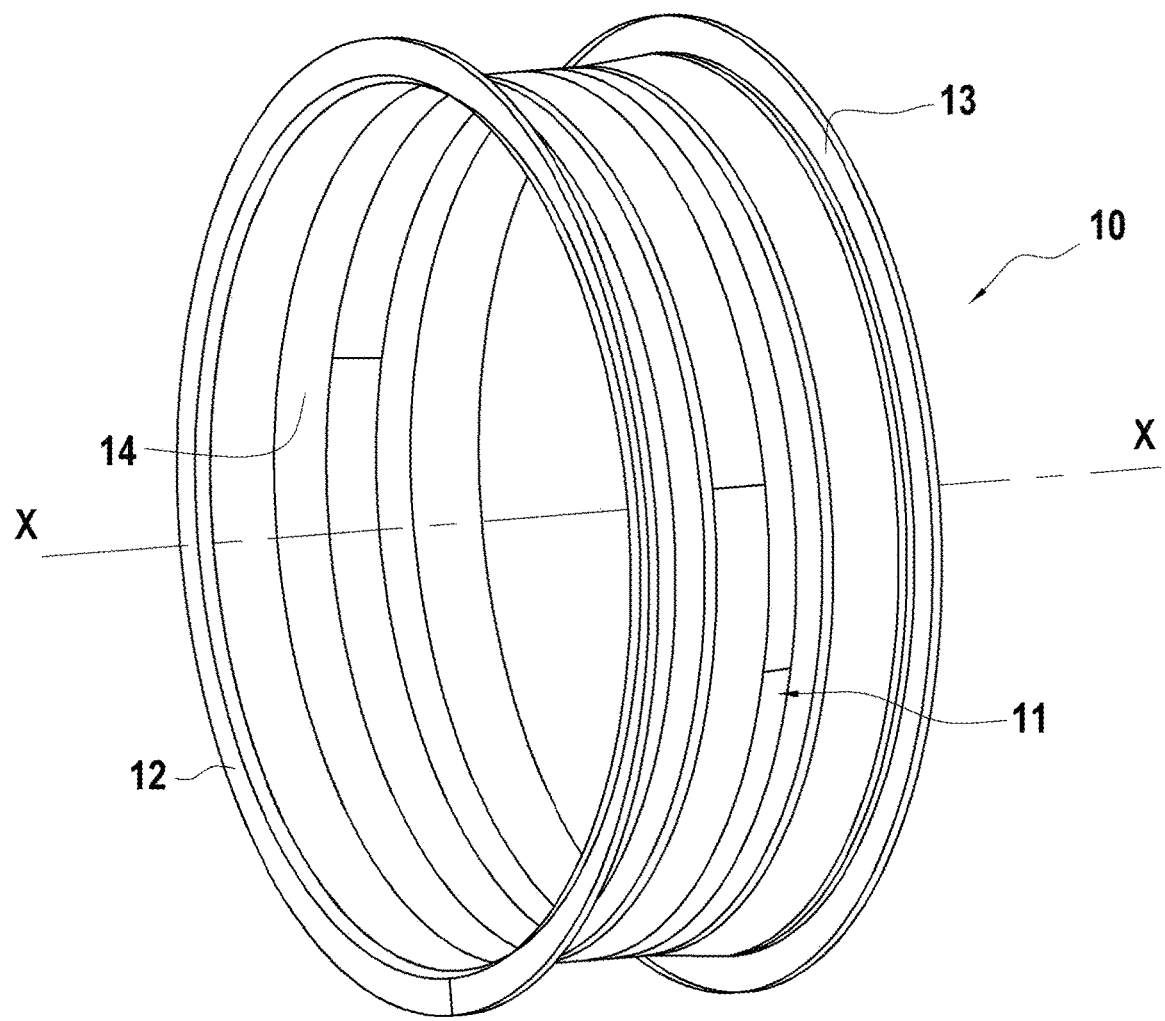

[Fig. 2A]
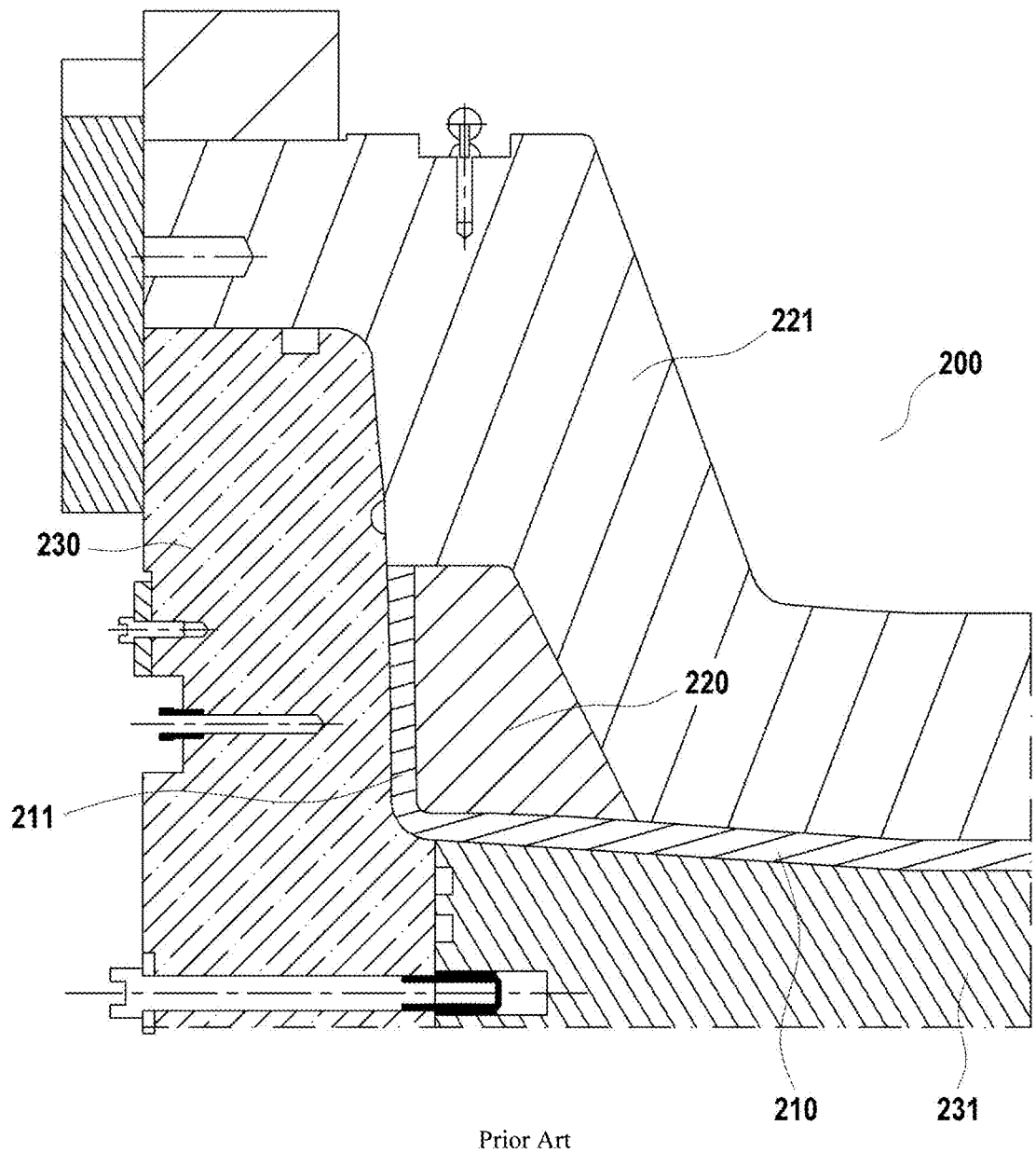
Prior Art

[Fig. 2B]
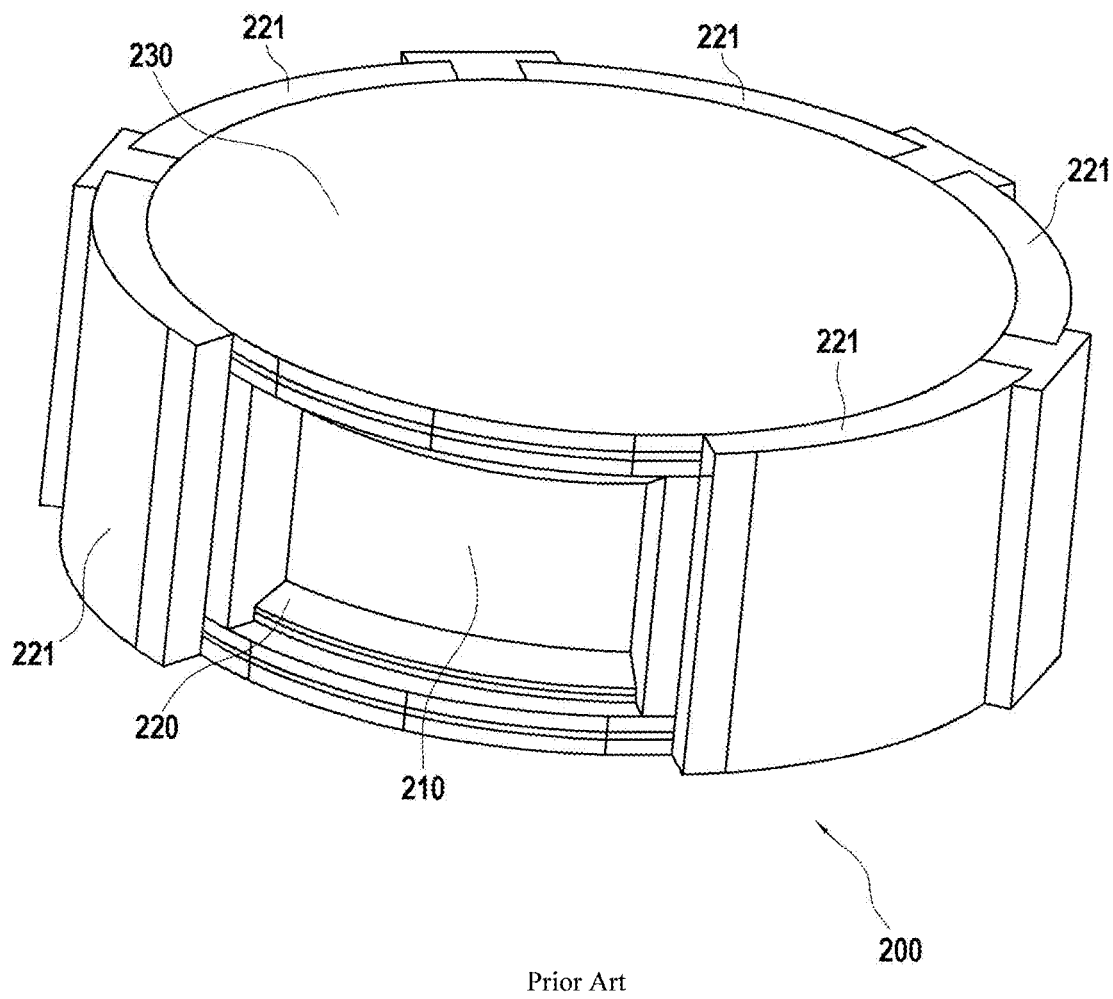
Prior Art

[Fig. 3]
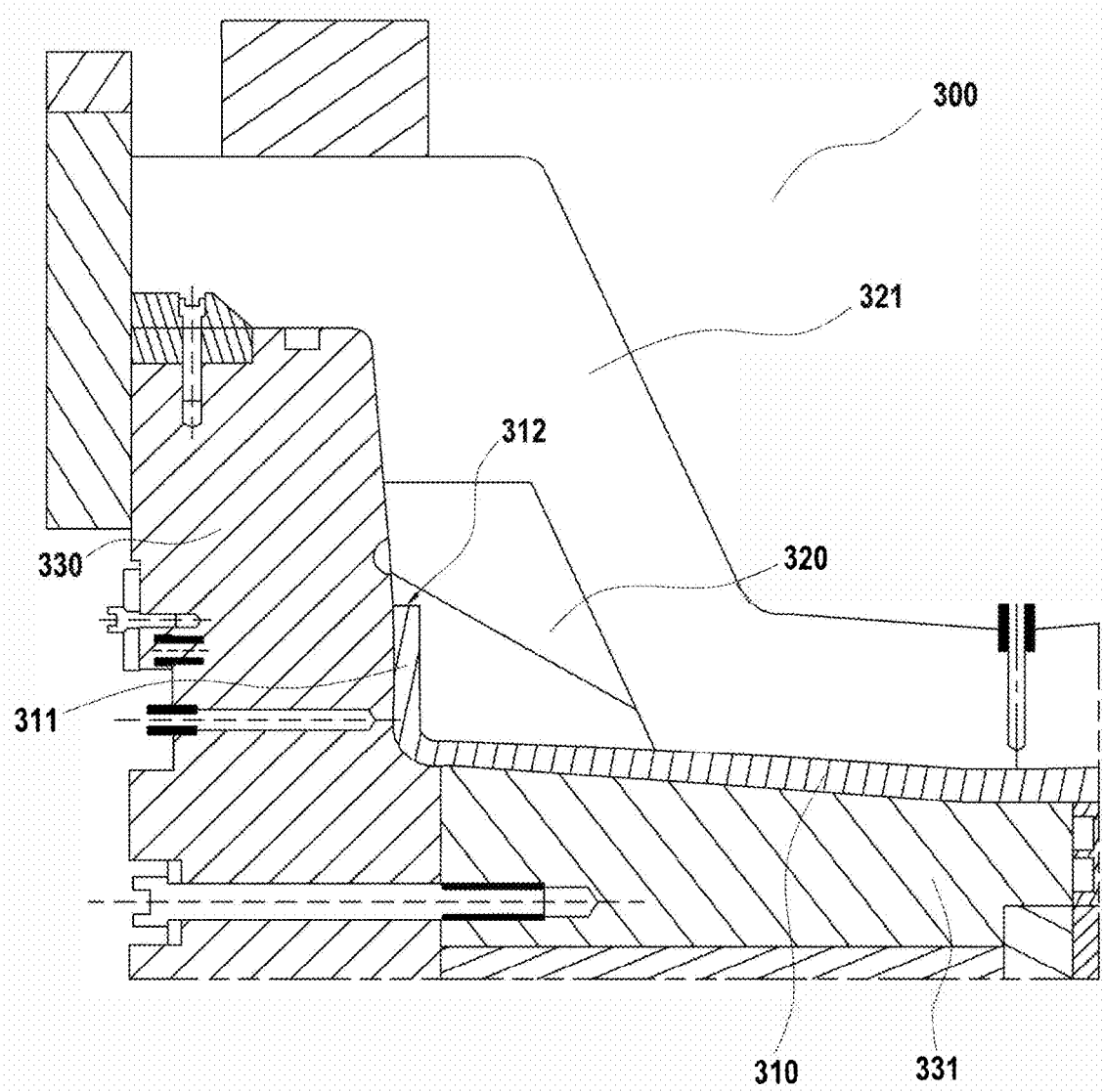

COMPACTING BLOCK FOR A FAN CASING MOULD

CROSS-REFERENCE TO RELATED APPLICATIONS

This is a National Stage Application under 35 U.S.C. § 371 of International Application No. PCT/FR2022/051677, filed Sep. 6, 2022, which claims priority to French Patent Application No. 2109711, filed on Sep. 16, 2021.

TECHNICAL FIELD

The present invention relates to the general field of manufacturing gas turbine casings, and more particularly retention casings for gas turbine fans for aeronautical engines.

PRIOR ART

In a gas turbine aero engine, a fan casing serves several functions. It defines the flow path for air intake into the engine, supports an abradable material facing the top of the fan blades, supports an optional sound wave absorption structure for acoustic treatment at the engine inlet and incorporates or supports a retention shield. The latter constitutes a trap retaining debris, such as ingested objects or fragments of damaged blades, projected by centrifugation, in order to prevent them from passing through the casing and reaching other portions of the aircraft.

The creation of a fan casing made of composite material has already been proposed. Reference can, for example, be made to patent EP 1 961 923 which describes the manufacture of a composite material casing with evolving thickness comprising the formation of a fibrous preform by superimposed layers of a fibrous texture and the densification of the fibrous reinforcement by a matrix. More precisely, this document provides for using a take-up mandrel for three-dimensional weaving of the fibrous texture, the latter then being wound in superimposed layers on an impregnation mandrel having an outer surface the profile of which corresponds to that of the central portion of the casing to be manufactured and two side flasks corresponding to casing fixing flanges. The fibrous preform is held on the impregnation mandrel and resin impregnation is carried out before polymerization.

To carry out the impregnation of the fibrous preform by a TRM (Resin Transfer Molding) type injection method, it is known to position the elements of a counter-mold on the impregnation mandrel and thus form an injection mold. Reference can, for example, be made to application WO 2013/060978 which discloses the installation of angular sectors to close the resin injection mold on the impregnation mandrel. When closing the injection mold, compacting wedges can be used to maintain the compaction force on the preform. These wedges are used in particular to compact the flanges of the ends of the preform which are vertical (or radial) and therefore have a direction of compaction different from the rest of the preform which has an axial direction of compaction. These wedges also allow to avoid that by directly placing sectors with a radial closing direction, these same sectors do not bend the flanges or cause them to buckle or shear.

Currently, the compacting wedges are, in the closed position, only in contact with the angular sectors of the counter-mold and the fibrous preform, particularly at the future fixing flanges of the casing. Since the axial positioning of the angular sectors has some variability and additional variability is added by the junction between the wedge and the sectors, the final variability of the positioning of the wedge is very large. This directly influences the final thickness of the part to be manufactured in this area. In addition, this is an area in which it is sought to have a good control of the thicknesses because the flanges are then machined. This control is also important for controlling the amount of carbon present in the final machined part, that is to say the amount of resin injected.

It is therefore desirable to have an injection mold, in particular a new compacting wedge allowing to reduce the interactions between the angular sectors and the wedge in order to reduce the variability of the thickness of the preform at the future casing flanges and thus adapt the amount of resin injected into the mold.

DISCLOSURE OF THE INVENTION

The invention relates to a mold intended to be used for the manufacture of a gas turbine fan casing made of composite material comprising:
- a mandrel on which a fibrous preform of a fan casing is intended to be wound said preform comprising an annular wall the profile of the outer surface of which corresponds to that of the inner surface of the casing to be manufactured and two side flasks the profiles of which correspond to those of outer flanges of the casing to be manufactured;
- a plurality of angular counter-mold sectors assembled in a sealed manner on the mandrel and intended to close the mold and to compact a fibrous preform wound on the mandrel, and
- at least one compacting wedge, the wedge being placed between the fibrous preform wound on the mandrel and the associated angular counter-mold sector, characterized in that the compacting wedge bears on one of the side flasks of the mandrel and covers the top of one of the outer flanges of the casing to be manufactured.

The mold according to the invention thus allows to improve the positioning of the compacting wedges. By bearing against one of the side flasks, the position of the wedges is more easily repeatable. Indeed, by having the wedges always placed in the same place and bearing on one of the flasks, the relative positioning of the mold parts will be more precise, and it will be easier to maintain a constant compaction force during the manufacture of several casings. Then this allows to improve the homogeneity of the thickness of the parts manufactured by this mold.

By improving the homogeneity of the thickness of the parts manufactured with this mold, it is possible to also simplify, or even eliminate, the step of re machining the part after injecting resin into the mold.

In addition, to be able to place the compacting wedges against one of the side flasks, it is possible to use compacting wedges in the radial direction of the mold larger than those of the prior art or reduce the extent of the outer flange in the radial direction and use the current compacting wedges. The advantage of reducing the size of the outer flange is to be able, in addition to improving the homogeneity of the thickness of the parts, to reduce the amount of resin injected into the mold.

Thus, the mold according to the invention is remarkable in that it allows to reduce the variability of the thicknesses of the final part and to reduce the amount of resin injected into the mold.

Another object of the invention is a method for closing an injection mold intended to be used for the manufacture of a gas turbine fan casing made of composite material, the mold comprising a mandrel on which a fibrous preform of a fan casing is intended to be wound, the mandrel comprising an annular wall the profile of the outer surface of which corresponds to that of the inner surface of the casing to be manufactured and two side flasks the profiles of which correspond to those of outer flanges of the casing to be manufactured, the mold also comprising a plurality of angular counter-mold sectors intended to close the mold and to compact the fibrous preform wound on the mandrel and at least one compacting wedge, the method comprising:

the tight assembly of the angular counter-mold sectors on the mold mandrel, and the placement of the compacting wedge on one of the side flasks, the compacting wedge being positioned against a longitudinal face of an associated angular counter-mold sector and being intended to cover the top of an outer flange of the casing to be manufactured.

Another object of the invention is a method for manufacturing a gas turbine fan casing made of composite material comprising:

winding a fibrous preform on the mandrel of a mold according to the invention;

closing the mold according to the closing method of the invention;

injecting a resin into the mold; and unmolding the fan casing.

Yet another object of the invention is a gas turbine comprising a fan casing manufactured by a manufacturing method according to the invention.

BRIEF DESCRIPTION OF THE DRAWINGS

Other features and advantages of the present invention will emerge from the description given below, with reference to the appended drawings which illustrate exemplary embodiments devoid of any limiting character.

FIG. 1 schematically and partially shows a gas turbine fan casing.

FIG. 2A schematically and partially shows a section of a mold according to the prior art, when it is closed.

FIG. 2B shows a perspective view of the mold of FIG. 2A.

FIG. 3 schematically and partially shows a mold according to the invention when it is closed.

DESCRIPTION OF EMBODIMENTS

The invention will be described below in the context of its application to the manufacture of a fan casing of an aeronautical gas turbine engine.

FIG. 1 shows a perspective view of a fan casing 10 which can be manufactured using a mold and a method according to the invention. Such a casing is centered on a longitudinal axis X-X and comprises an annular wall 11 delimited upstream by an upstream flange 12 and downstream by a downstream flange 13 (the upstream and downstream being defined in relation to the direction of flow of the gas flow in the gas turbine). The inner surface 14 of the annular wall 11 is intended to delimit the flow path for air intake into the gas turbine.

FIGS. 2A and 2B schematically and partially show a mold 200 according to the prior art, when it is closed. FIG. 2A is a sectional view and FIG. 2B a perspective view of the mold 200.

Such a mold 200 can be used for the impregnation by a method of the RTM ("Resin Transfer Molding") type of a fibrous preform 210 in order to manufacture a fan casing 10 such as that shown in FIG. 1. The fibrous preform 210 can be produced by three-dimensional weaving of fibers, for example carbon, glass, aramid or ceramic, and the impregnation matrix can be made of polymer, for example epoxide, bismaleimide or polyimide.

The mold 200 is rotatably mounted on a drive axis (not shown) centered on the axis X-X, and comprises a mandrel 231. The mandrel 231 comprises an annular wall in the shape of a barrel on which is intended to be wound a fibrous preform 210, and two side flasks (only one flask 230 is shown). The mandrel 231 is held on its drive axis by means of spokes not shown.

The side flasks 230 form a support intended to receive the folded portions 211 of the preform 210 wound on the mandrel 231, and which are intended to form the upstream 12 and downstream 13 flanges of the fan casing 10.

The mold 200 also comprises a counter-mold composed of a plurality of angular sectors 221 assembled in a sealed manner on the mandrel 231, and two compacting wedges 220. In FIG. 2A, only one angular sector 221 with its compacting wedge 220 are shown.

According to the prior art, the compacting wedge 220 is placed between the fibrous preform 210 wound on the mandrel 231 and an angular sector 221 of the counter-mold. The angular sector 221 bears against the flask 230. The compacting wedge 220 has the same height as the future flange 211 of the casing, and therefore does not bear against the flask 230.

FIG. 3 schematically and partially shows a sectional view of a mold 300 according to the invention, when it is closed.

Like the mold 200 of the prior art, the mold 300 according to the invention can be used for the impregnation by a method of the RTM ("Resin Transfer Molding") type of a fibrous preform 310 in order to manufacture a fan casing 10 such as that shown in FIG. 1.

The mold 300 is rotatably mounted on a drive axis (not shown) centered on the axis X-X, and comprises a mandrel 331. The mandrel 331 comprises an annular wall in the form of a barrel on which a fibrous preform 310 is intended to be wound, and two side flasks (only one flask 330 is shown). The mandrel 331 is held on its drive axis by means of spokes not shown.

The side flasks 330 form a support intended to receive the folded portions 311 of the preform 310 wound on the mandrel 331, and which are intended to form the upstream 12 and downstream 13 flanges of the fan casing 10.

The mold 300 also comprises a counter-mold composed of a plurality of angular sectors 321 assembled in a sealed manner on the mandrel 331, and at least one compacting wedge 320.

Unlike the prior art, the compacting wedge 320 is placed between the fibrous preform 310 wound on the mandrel 331 and an angular sector 321 of the counter-mold, and bears against the side flask 330. The angular sector 321 is also bearing against the flask 330.

Thus, the compacting wedge 320 is larger than the future flange 311 of the casing so as to cover the top 312. For this purpose, it is possible either to use compacting wedges of the same general dimension as the current wedges and reduce the size of the outer flange, or maintain the size of the outer flange and increase the size of the compacting wedge.

The relative position of the compacting wedge 320 and the flask 330 is therefore more easily repeatable and thus allows to limit variations in the thickness of the preform 310 during its compaction. Thus the step of re-machining the part after compaction and injection of resin into the mold 300 is simplified, or even eliminated.

In addition, for the compacting wedge 320 to bear on the side flask 330, it is possible to either use a wedge larger than those of the prior art or use the wedges of the prior art and reduce the size of the upstream 12 and downstream 13 flanges of the casing 10 to be manufactured. By thus reducing the size of the flanges, it is also possible to reduce the amount of resin injected into the mold 300.

If the preform 310 is intended to comprise two side flanges, it is possible to have two compacting wedges per angular sector, the wedges being intended to cover the top of the two flanges.

In the case where the compacting wedges are left in place on the mold following compaction to close the mold and carry out an injection, it is also possible to have at least two compacting wedges per angular sector, the wedges being intended to cover the top of the flanges. For example, three compacting wedges per angular sector can be used.

In the same case, it is also possible to have one compacting wedge per angular sector, the wedge being intended to cover the top of one of the flanges.

In the same case, it is also possible to have more angular sectors than compacting wedges. For example, the mold can comprise three compacting wedges and six angular sectors.

It is also possible to have only one compacting wedge. This could for example be implemented in the case where the injection is made with another mold, or in the case where the preform is intended to comprise only one side flange.

The manufacture of a fan casing 10 is now described.

A fibrous preform is first wound on the mandrel 331 of a mold 300 according to the invention. Methods have already been proposed for winding a fibrous preform produced for example by three-dimensional weaving around a mandrel 331 such as that of the invention, and will not be described in more detail. Reference can, for example, be made to application WO 2012/140355 which proposes a machine for winding a fibrous texture on an impregnation mandrel.

Once the preform is wound on the mandrel, the mold must be closed to compact the preform. For this purpose, the angular sectors must be assembled on the mandrel in a sealed manner and the wedge must be placed on one of the side flasks so as to cover the top of the future flange of the casing being manufactured. The compacting wedge is also positioned against a longitudinal face of an angular sector. Thus, the wedge bears on one of the side flasks, and it is simply pushed onto the preform to obtain a lower positioning variability, that is to say greater precision. With several wedges, the step of placing the wedge is therefore repeated to be able to position the wedges against a longitudinal face of an angular sector and place each wedge on one of the side flasks so that the top of the future flange of the casing being manufactured is covered by the wedges.

The wedges allow compaction in a direction substantially perpendicular to the preform and therefore help to avoid folds and buckling.

A polymerizable resin is then injected into the mold by a pressure differential (by an RTM type method), and the latter is polymerized (by heating or cooling for example, depending on the nature of the resin used). The fan casing thus manufactured can then be demolded.

The invention claimed is:

1. A mold intended to be used for the manufacture of a gas turbine fan casing made of composite material comprising:
a mandrel on which a fibrous preform of a fan casing is intended to be wound said preform comprising an annular wall, a profile of an outer surface of which corresponds to that of an inner surface of the casing to be manufactured and two side flasks the profiles of which correspond to those of outer flanges of the casing to be manufactured;

a plurality of angular counter-mold sectors intended to be assembled in a sealed manner on the mandrel and intended to close the mold and to compact a fibrous preform wound on the mandrel, and at least one compacting wedge, the wedge being intended to be placed between the fibrous preform wound on the mandrel and an associated angular counter-mold sector, wherein the compacting wedge bears on one of the side flasks of the mandrel and is intended to cover a top of one of the outer flanges of the casing to be manufactured.

2. A method for closing an injection mold intended to be used for manufacture of a gas turbine fan casing made of composite material, the mold comprising a mandrel on which a fibrous preform of a fan casing is intended to be wound, the mandrel comprising an annular wall, a profile of an outer surface of which corresponds to that of an inner surface of the fan casing to be manufactured and two side flasks, profiles of which correspond to those of outer flanges of the fan casing to be manufactured, the mold also comprising a plurality of angular counter-mold sectors intended to close the mold and to compact the fibrous preform wound on the mandrel and at least one compacting wedge, the method comprising:

tightly assembling the counter-mold sectors on the mandrel; and placing the at least one compacting wedge on one of the side flasks, the at least one compacting wedge being positioned against a longitudinal face of an associated angular counter-mold sector and being intended to cover a top of an outer flange of the fan casing to be manufactured.

3. The method for manufacturing a gas turbine fan casing made of composite material comprising:

winding a fibrous preform on the mandrel of the mold, wherein the mold comprises:

the mandrel on which the a fibrous preform of a fan casing is intended to be wound, said preform comprising an annular wall the profile of the outer surface of which corresponds to that of the inner surface of the casing to be manufactured and two side flasks, the profiles of which correspond to those of outer flanges of the casing to be manufactured;

a plurality of angular counter-mold sectors intended to be assembled in a sealed manner on the mandrel and intended to close the mold and to compact the fibrous preform wound on the mandrel, and at least one compacting wedge, the wedge being intended to be placed between the fibrous preform wound on the mandrel and the associated angular counter-mold sector, wherein the compacting wedge bears on one of the side flasks of the mandrel and is intended to cover the top of one of the outer flanges of the casing to be manufactured;

closing the mold according to the method of claim 2;

injecting a resin into the mold; and unmolding the fan casing.

4. A method of manufacturing a gas turbine, the method comprising:
   manufacturing a gas turbine fan casing by a method according to claim 3; and
   installing the gas turbine fan casing on an engine, thereby providing the gas turbine.

\* \* \* \* \*